United States Patent
Vainio et al.

(10) Patent No.: US 8,731,914 B2
(45) Date of Patent: May 20, 2014

(54) SYSTEM AND METHOD FOR WINDING AUDIO CONTENT USING A VOICE ACTIVITY DETECTION ALGORITHM

(75) Inventors: Janne Vainio, Pirkkala (FI); Hannu J. Mikkola, Tampere (FI); Jari M. Makinen, Tampere (FI)

(73) Assignee: Nokia Corporation, Espoo (FI)

( * ) Notice: Subject to any disclaimer, the term of this patent is extended or adjusted under 35 U.S.C. 154(b) by 947 days.

(21) Appl. No.: 11/274,612

(22) Filed: Nov. 15, 2005

(65) Prior Publication Data

US 2007/0112562 A1    May 17, 2007

(51) Int. Cl.
G10L 21/00    (2013.01)
G10L 25/93    (2013.01)
G06F 17/20    (2006.01)
G10L 25/00    (2013.01)

(52) U.S. Cl.
USPC ............... 704/215; 704/8; 704/214; 704/278

(58) Field of Classification Search
USPC ..................... 704/3, 214, 215, 233
See application file for complete search history.

(56) References Cited

U.S. PATENT DOCUMENTS

| | | | |
|---|---|---|---|
| 5,530,686 A * | 6/1996 | Schylander et al. | 369/30.04 |
| 5,649,055 A | 7/1997 | Gupta et al. | |
| 6,138,091 A * | 10/2000 | Haataja et al. | 704/215 |
| 6,161,087 A * | 12/2000 | Wightman et al. | 704/215 |
| 6,721,490 B1 | 4/2004 | Yao et al. | |
| 6,961,954 B1 * | 11/2005 | Maybury et al. | 725/53 |
| 2006/0024031 A1 * | 2/2006 | Taira et al. | 386/95 |
| 2006/0089857 A1 | 4/2006 | Zimmerman et al. | |

FOREIGN PATENT DOCUMENTS

DE    296 08 439 U1    8/1966
JP    10 106064 A    4/1998

OTHER PUBLICATIONS

Dorian Miller, PDF to MP3 converter Design Rational, Internet article, Jan. 29, 2003, pp. 8.
Visuaide, Victor Reader Classic User's Guide, Internet Article, pp. 16.
European Search report for European Application No. 06820907 mailed Dec. 12, 2008.
International Search Report for PCT Application No. PCT/IB2006/003249 mailed Apr. 25, 2007.

* cited by examiner

*Primary Examiner* — Richemond Dorvil
*Assistant Examiner* — Olujimi Adesanya
(74) *Attorney, Agent, or Firm* — Alston & Bird LLP

(57) ABSTRACT

A system and method for locating a preferable playback start location after a winding or rewinding action in an audio playing device. In response to an adjustment of the playing location for audio content to a desired playing position, the system determines whether at least one non-speech or silent period of at least a predetermined duration exists within the vicinity of the desired playing position. If at least one such non-speech or silent period exists within the vicinity of the desired playing position, the system adjusts the playing position to fall within one of the at least one non-speech period or silent period.

19 Claims, 5 Drawing Sheets

SYSTEM AND METHOD FOR WINDING AUDIO CONTENT USING A VOICE ACTIVITY DETECTION ALGORITHM

FIELD OF THE INVENTION

The present invention relates generally to voice compression. More particularly, the present invention relates to the use of voice compression techniques for improving the usability and quality of audio playback applications.

BACKGROUND OF THE INVENTION

In audio applications on electronic devices, rewinding/winding has become a required feature. In applications such as the RealPlayer, a user is capable of moving forward and backwards through various audio tracks. This feature can be used for a variety of purposes, such as to revisit a portion of an audio book where the user was distracted, or to skip ahead to a desired location within the audio content.

Winding and rewinding is conventionally performed based upon a certain time duration. Such systems can automatically move backwards or forwards in a track by a predetermined period of time with each "touch," or the length of time can be dependent upon the length of time that a user presses a "forward" or "rewind" button or icon. It is also possible for the position in an audio track to be selected arbitrarily, where audio playback always starts from a selected location in the audio regardless of the track's content. In other words, in these systems, the playback position is not dependent on the audio content of a signal.

To demonstrate this issue, it is helpful to look at the effect of rewinding on both music content and speech content. If music content is rewinded back by, for example, twenty seconds, playback will then start in the middle of the music, without control of the exact starting position. Generally, this is not considered to be a significant issue because a music signal is usually considered to be a continuous signal. As a result of this fact, the user will usually not lose track of the music signal, even when playback is started in the middle of a music section.

If the audio comprises spoken speech, words, sentences, paragraphs or chapters, on the other hand, the situation is quite different. If such audio content is played starting in the middle of a word, sentence, paragraph or chapter, the entire meaning of the speech may be lost, as a person may not be able to infer the spoken text that exists before the playback starting point. This problem occurs frequently when traditional winding method is used, i.e., when a winding button is pressed and the playing position of the audio track is moved by an arbitrary time interval. In conventional winding systems, there is no control mechanism that can ensure that audio playing will start at the beginning of a word, sentence, paragraph or chapter, and such a system would be highly desirable by the user.

Audio content can include a type of indexing feature that is defined by the producer of the content. For example, the Victor Reader Classic talking book player includes keys that allow the user to easily move from one book element to another, permitting the user to quickly go to desired information. In such systems, a user is capable of moving by chapter, section, page, paragraph, book, or other elements that are defined by the book's producer. However, such a system only permits the user to wind or rewind to a limited set of pre-defined locations.

With music content, a user may often select only certain tracks within a music track collection for playback or play the entire track collection from start to finish. In such situations, the need for winding is not necessary, although basic winding functionality is usually still implemented in such music-specific applications. However, when the audio content includes speech, winding and rewinding is substantially more important, because the user is not simply listening to tracks or songs but is instead interested in "textual context." For example, when a user is listening to an audio book, he or she may want to listen to specific chapters, paragraphs, sentences or even words in order to obtain the necessary or desired context of the respective section.

Another method of navigating through audio content is to divide the content into individual tracks to enable a listener to easily navigate through the document. Individual tracks are easy to access by moving back and forth between tracks. With this technique, the listener can efficiently access a desired section. For example, a listener can first browse various section headings that correspond to various tracks in order to find the section he or she wants to listen to. The user can then use the section numbers included with the section headings to travel to the desired section; the section number announced at the start of each section indicates if the desired section is before or after the current track. Once again, however, the user's options for winding and rewinding are limited. Using such a "track" system, for example, a user may not be able to rewind the audio to hear only a few seconds of sound that he or she may have missed during the original playing. Instead, the user would have to go back to, at a minimum, the beginning of the track, regardless of whether the beginning of the track was a few seconds or several minutes backwards in time. The user's only other option would be to attempt to manually wind or rewind the audio content, which leads to the problem of broken words, sentences, etc. discussed above.

It would therefore be desirable to provide a system and method for permitting the winding and rewinding of audio content that addresses the above-identified difficulties.

SUMMARY OF THE INVENTION

The present invention provides for an improved system and method for audio winding and rewinding. According to the present invention, the position where playback is started after winding or rewinding is selected based upon the underlying audio signal in the audio content. Because speech signals tend to have burst-like characteristics, short "non-speech" period or silent periods exist within speech signal bursts. The present invention uses the presence and absence of bursts to find a location in the audio content which is not in the middle of a word, sentence or paragraph. The present invention then starts the playback in one of these locations.

The present invention provides for a number of advantages not found in conventional systems. By starting playback in locations that are not in the middle of words, sentences or paragraphs, the user receives a more pleasant audio playback without having to suffer through annoying speech/audio clipping. The present invention allows for the informative portion of a piece of audio content to be conveyed to the user completely when the playback is started, and eliminates the need to have to wind or rewind again due to the precise location not being correct. As a result, there is a greatly reduced need for continuous iterations of winding and rewinding until the precise desired location is found, as has been conventionally necessary on playback devices dating back to the first tape recorders. The present invention can be used on a wide variety of electronic devices, including mobile electronic devices such as mobile telephones.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
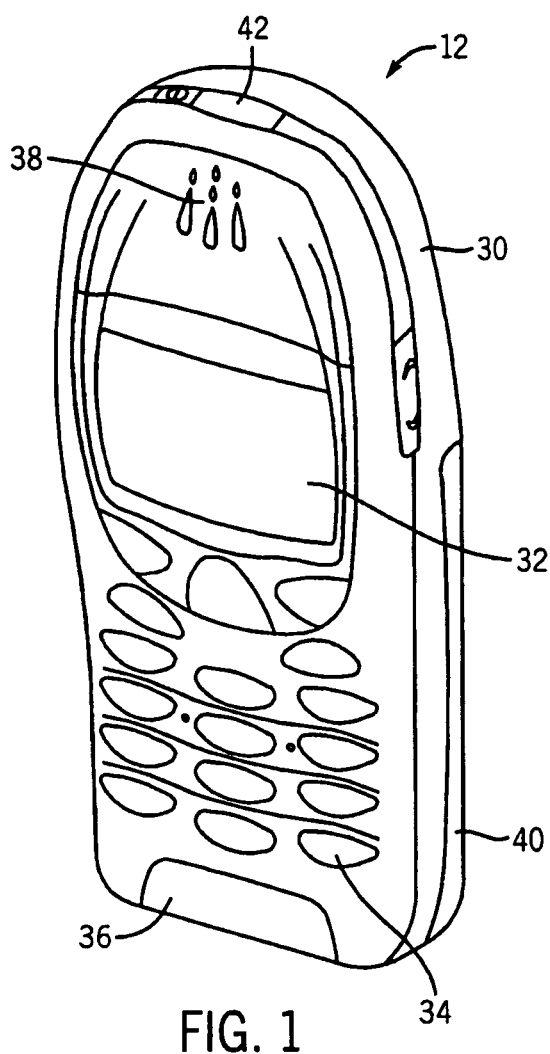
FIG. 1 is a perspective view of a mobile telephone that can be used in the implementation of the present invention.
Figure 2:
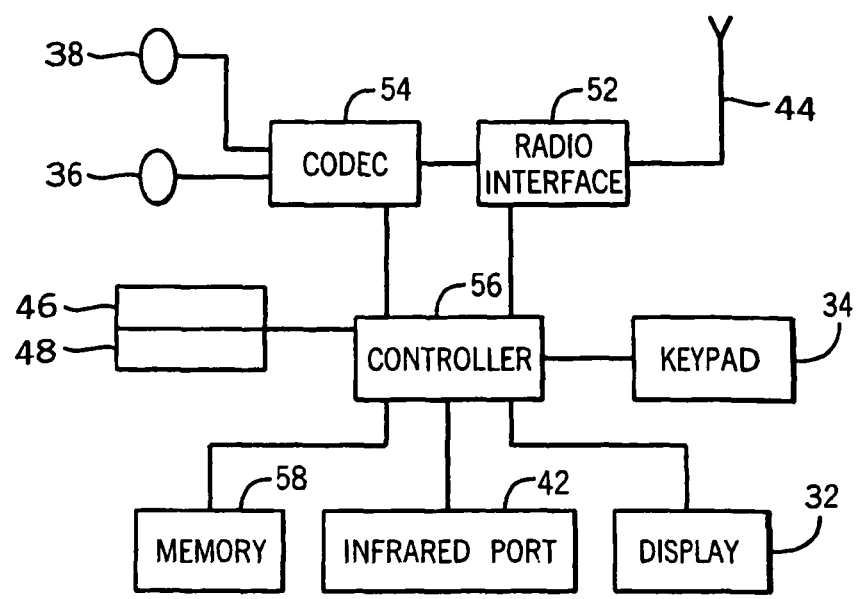
FIG. 2 is a schematic representation of the telephone circuitry of the mobile telephone of FIG. 1.

FIGS. 1 and 2 show one representative mobile telephone 12 within which the present invention may be implemented. It should be understood, however, that the present invention is not intended to be limited to one particular type of mobile telephone 12 or other electronic device. Instead, the present invention can be incorporated into virtually any type of electronic device, including but not limited to laptop and desktop computers, personal digital assistants, dictating machines, integrated messaging devices, printers, scanners, fax machines and other devices.

The mobile telephone 12 of FIGS. 1 and 2 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The present invention provides for an improved system and method for audio winding and rewinding. According to the present invention, the position where playback is started after winding or rewinding is selected based upon the underlying audio signal in the audio content. Because speech signals tend to have burst-like characteristics, short non-speech periods or silent periods exist within speech signal bursts. The present invention uses the presence and absence of bursts to find a location in the audio content which is not in the middle of a word, sentence or paragraph. The present invention then starts the playback in one of these locations.

Figure 4:
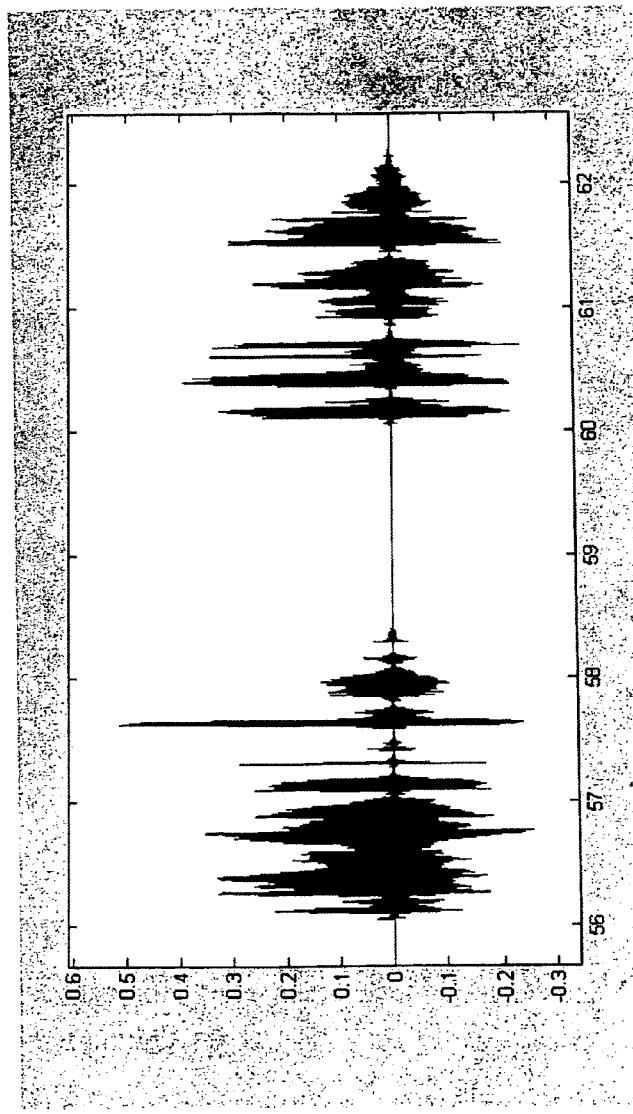
FIG. 4 is a plot showing the burst characteristics of a speech signal.

It has been estimated that speech activity in audio content, such as audio books or audio news, can comprise about around 80% of the total content. In other words, about 80% of a selected contact track will comprise actual speech, while the remaining 20% would comprise periods of relative silence, such as between paragraphs, or sections of the content. For this reason, it is likely that, after any winding or rewinding occurs within a piece of audio content, the playback position will be in the middle of a sentence or word, and not in a non-speech period or silent period. However, speech signals usually have a high tendency of sound bursts, meaning that even one second of speech might include many short periods of silence. FIG. 4 shows these "bursty" characteristics within a speech signal. As can be observed in this figure. There are several short periods that are characterized as possess a general lack of sound activity, as well as one longer period of silence According to the proposed invention, the position where playback is started after winding or rewinding is selected based upon the audio signal. In the present invention, a user first implements general winding and rewinding methods to move the playing position to a generally location. The system then uses this general location as a starting point and then locates a non-speech period that meets predetermined criteria. This non-speech period is then selected as the actual starting point.

Figure 3:
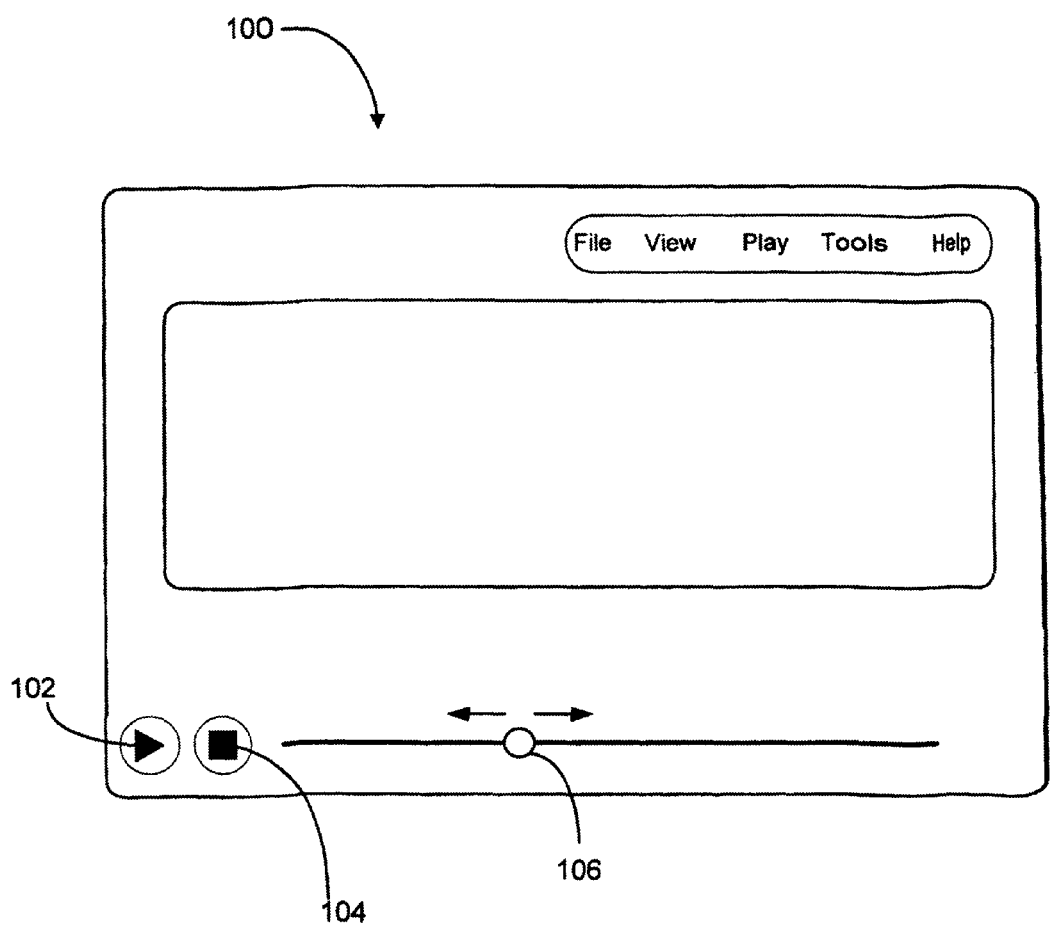
FIG. 3 is a representation of a media player/audio player within which the present invention may be implemented.

FIG. 3 is a representation of an audio player 100 within which the present invention may be implemented. The audio player 100 includes a play button 102, a stop button 104, and a position control dial 106. In many such systems, a user can use a cursor to move the position control dial 106 forward or backwards (referred to herein as winding or rewinding, respectively) through a piece of audio content. The user can then actuate the play button 102 to begin playing the content at the selected position.

Figure 5:
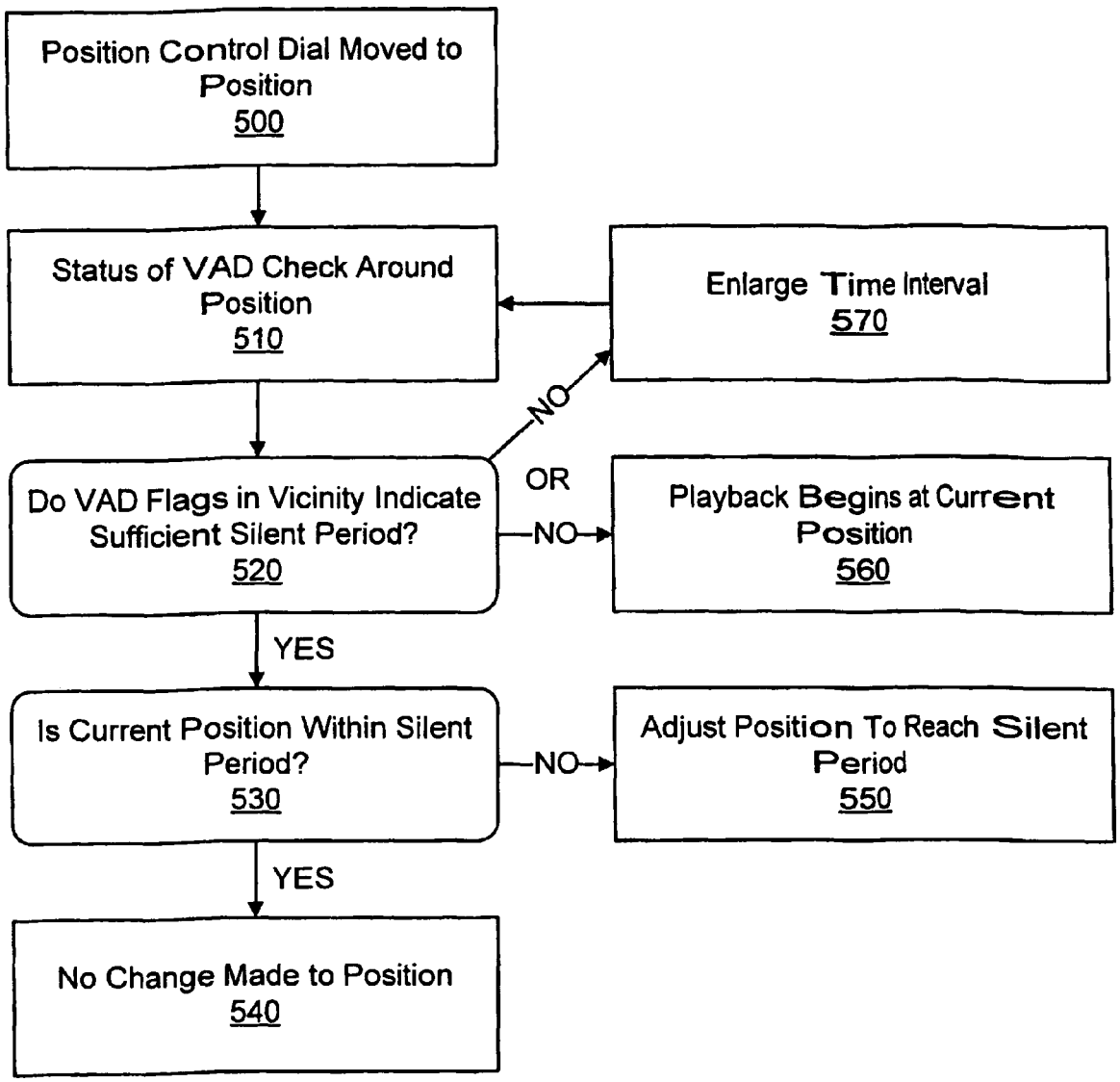
FIG. 5 is a flow chart showing the implementation of one embodiment of the present invention.

FIG. 5 is a flow chart showing the implementation of one embodiment of the present invention. At step 500 in FIG. 5, a user moves the position control dial 106 of the audio player 100 either forward or backwards to a desired general position. At step 510, the status of a voice activity detection (VAD) flag is checked around the selected position to be played. If the selected position in the audio content is identified as X, for example, the voice activity flag is checked in every speech frame that is in the vicinity of X. The vicinity can comprise, for example, 0.5 seconds forward and 0.5 seconds backward from the selected position X. The vicinity could also comprise "non-symmetrical" time periods around the selected position X (i.e., 0.5 seconds backward and only 0.25 seconds forward), or the entire vicinity could be before or after the selected position X. One second of audio usually includes several speech frames. For example, speech frames of AMR and AMR-WB codecs are 20 ms long. Therefore, one second of audio signal possesses 50 speech frames. It should be noted that the numerical values discussed herein are only examples and can be altered depending on the exact application, or type of content. Variations of these numerical values can be used by those skilled in the art under the present invention.

It should be noted that, although a VAD flag and algorithm is discussed herein, any suitable or desirable algorithm can be used for detecting whether certain periods of audio content contain speech or do not contain speech. For example, current cellular codecs such as GSM AMR or GSM AMR-WB contain algorithms which can be used for this purpose. In addition, custom-made algorithms can be used for the implementation of the present invention.

At step 520 in FIG. 5, it is determined whether the VAD flags within the vicinity indicate that a sufficiently long non-speech period has been found within the investigated time interval. "Sufficiently long" can be based upon a predetermined time threshold, and "non-speech period" can refer to the amount of recorded sound being below a predetermined threshold. For example, a "non-speech" period can refer to a period where only general background noise and/or background music is determined, or it can refer to a complete silent period where no sound is detected at all. Other definitions for "non-speech period" are also possible. "Sufficiently long" may depend upon the application being used and/or user preferences, as well as whether the application and/or the user wants to wind or rewind word-by-word, sentence-by-sentence or paragraph-by-paragraph. For example, the user may have a preference that playback always begins at the start of a paragraph, which would require searching for relative long non-speech periods. If the preference were for the beginning of a word, on the other hand, "sufficiently long" would constitute a shorter time interval. Therefore, the duration of the desired non-speech period can vary significantly, ranging from as little as single speech frame (which is usually around 20 ms) to several seconds (which comprises tens of speech frames).

If there is a sufficiently long non-speech period within the interval, then it is determined whether the exact playing position selected by the user is set within a sufficiently long non-speech period at step 530. If the exact playing position selected by the user is set within a sufficiently long non-speech period, then no adjustment is made to the playing position at step 540. If the exact playing position selected by the user is not set within a sufficiently long non-speech period, then the playing position is adjusted to occur within the nearest sufficiently long non-speech period at step 550. If more than one non-speech period is found, then non-speech period closest to the position X is selected to be the position to start the playback. In one embodiment of the invention, positions backward or behind from the current position X are preferred so as to not miss the start of the sentence or word of interest to the user. This preference can take a variety of forms. For example, the system first could scan the entire portion of the interval before the selected position first, and only scan the remainder of the interval if no sufficient long non-speech periods exist before the selected position. Alternatively, this preference can be "weaker" in that the system goes "backwards" only if there are two non-speech periods substantially equidistant in time from the selected position. Other permutations for such preferences are also possible. Additionally, system or user requirements can dictate the exact position within the sufficiently long non-speech period for playback to start. For example, playback can ultimately begin at the beginning, midpoint, or end of the non-speech period, or another period could also be selected.

If no non-speech periods are found within the designated time interval, then playback is started at the selected position at step 560 in one embodiment of the invention. In an alternative embodiment, an iterative technique may be used instead. Instead of simply choosing the selected position, a longer time interval is selected at step 570 and searched for an acceptable time interval. This process can repeated a certain number of times (i.e., up until a maximum time interval or until the beginning or end of a track is reached) or indefinitely, with each repeat of process involving the increase of the time interval being searched. During this process, the required duration of the non-speech period can also be increased, if necessary or desired. The concept of changing the duration of the non-speech period is based upon the fact that, the longer is the non-speech period, the more significant is the pause in the speech content. Therefore, one can allow more deviation from the original playback position X. This depends on whether the user or system desires to find pauses between sentences, chapters or words. For example, for audio books, it may often be desirable to wind paragraph by paragraph, in which case the system would attempt to search for longer non-speech periods than would be necessary for winding sentence by sentence.

It should be noted that, although particular methods for determining silence periods in speech are discussed herein, the present invention can also include other methods of differentiating pauses between words, sentences or paragraphs. For example, methods such as utilizing statistics of spoken speech for different languages can be used to implement the detection of pauses between words, sentences, paragraphs or chapters. Alternatively, the present invention can be implemented without any differentiation between pause types (i.e., words, sentences, etc.), instead simply looking to the nearest silence period from a selected position in accordance with the process depicted in FIG. 5.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represent examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method comprising:

determining, automatically, if a desired playing position comprises a non-speech segment of at least a predetermined duration in response to a winding or a rewinding of an audio content in an audio playing device resulting in a change in the playing location of the audio content to the desired playing position;

wherein if the desired playing position comprises a non-speech segment of at least a redetermined duration no adjustment to the playing position is performed;

wherein if the desired playing position does not comprise a non-speech segment of at least a predetermined duration, the method further comprises:

determining whether at least one non-speech period of at least the predetermined duration exists within a time interval in the vicinity of the desired playing position; and adjusting, automatically, the desired playing position to fall within one non-speech period in response to determination of existence of at least one non-speech period of at least the predetermined duration within the time interval in the vicinity of the desired playing position, wherein, if more than one non-speech periods of at least the predetermined duration exist within the time interval in the vicinity of the desired playing position, the playing position is automatically adjusted to fall within the non-speech period that is closest in time to desired playing position.

2. The method of claim 1, wherein the predetermined duration comprises a designated period of time before and after the desired playing position.

3. The method of claim 1, wherein, if a non-speech period of at least the predetermined duration exists within the time interval in the vicinity of the desired playing position before the desired playing position, and if a non-speech period of at least the predetermined duration exists within the time interval in the vicinity of the desired playing position after the desired playing position, the playing position is automatically adjusted to fall within the non-speech period before the desired playing position.

4. The method of claim 1, wherein the determining of whether at least one non-speech period of at least a predetermined duration exists within the time interval in the vicinity of the desired playing position includes checking the status voice activity detection flags for every sound frame that is within the time interval in the vicinity of the desired playing position.

5. The method of claim 1, wherein a non-speech period comprises a length of time where any recorded sound does not exceed a predetermined threshold in magnitude.

6. The method of claim 1, wherein if no non-speech period of at least the predetermined duration exists within the time interval in the vicinity of the desired playing position the method further comprises;
not adjusting the desired playing position.

7. The method of claim 1, wherein if no non-speech period of at least the predetermined duration exists within the time interval in the vicinity of the desired playing position the method further comprises;
lengthening the duration of the time interval in the vicinity of the desired playing position;
determining whether at least one non-speech period of at least a predetermined duration exists within the lengthened time interval in the vicinity of the desired playing position; and
adjusting, automatically, the desired playing position to fall within one non-speech period if at least one non-speech period of at least the predetermined duration exists within the lengthened time interval in the vicinity of the desired playing position.

8. The method of claim 7, wherein if no non-speech period of at least the predetermined duration exists within the lengthened time interval in the vicinity of the desired playing position the method further comprises;
lengthening the time interval in the vicinity of the desired playing position until a non-speech period of at least the predetermined duration is found or until a predetermined number of lengthenings of the time interval in the vicinity of the desired playing position has been attempted; and
adjusting, automatically, the desired playing position to fall within one non-speech period if at least one non-speech period of at least the predetermined duration exists within a lengthened time interval in the vicinity of the desired playing position before the predetermined number of lengthenings of the time interval in the vicinity of the desired playing position has been attempted.

9. A computer program product, comprising at least one non-transitory computer readable medium having computer-executable program code portions stored therein, the computer-executable program code portions comprising program code instructions configured to:

determine, automatically, if a desired playing position comprises a non-speech segment of at least a predetermined duration in response to a change in the playing location of an audio content to the desired playing position
wherein if the desired playing position comprises a non-speech segment of at least a predetermined duration no adjustment to the playing position is performed;
wherein if the desired playing position does not comprise a non-speech segment of at least a predetermined duration, the method further comprises:
determine whether at least one non-speech period of at least the predetermined duration exists within a time interval in the vicinity of the desired playing position; and
adjust, automatically, the desired playing position to fall within one non-speech period in response to determination of existence of at least one non-speech period of at least the predetermined duration within the time interval in the vicinity of the desired playing position, wherein, if more than one non-speech periods of at least the predetermined duration exist within the time interval in the vicinity of the desired playing position, the playing position is automatically adjusted to fall within the non-speech period that is closest in time to desired playing position.

10. The computer program product of claim 9, wherein the predetermined duration comprises a designated period of time before and after the desired playing position.

11. The computer program product of claim 9, wherein, if a non-speech period of at least the predetermined duration exists within the time interval in the vicinity of the desired playing position before the desired playing position, and if a non-speech period of at least the predetermined duration exists within the time interval in the vicinity of the desired playing position after the desired playing position, the playing position is automatically adjusted to fall within the non-speech period before the desired playing position.

12. The computer program product of claim 9, wherein if no non-speech period of at least the predetermined duration exists within the time interval in the vicinity of the desired playing position, the computer-executable program code portions further comprise computer program code instructions configured to;
not adjust the desired playing position.

13. The computer program product of claim 9, wherein if no non-speech period of at least the predetermined duration exists within the time interval in the vicinity of the desired playing position, the computer-executable program code portions further comprise computer program code instructions configured to;
lengthen the duration of the time interval in the vicinity of the desired playing position;
determine whether at least one non-speech period of at least a predetermined duration exists within the lengthened time interval in the vicinity of the desired playing position; and
adjust, automatically, the desired playing position to fall within one non-speech period if at least one non-speech period of at least the predetermined duration exists within the lengthened time interval in the vicinity of the desired playing position.

14. An electronic device, comprising a processor; and a memory including computer program code, the memory and the computer program code configured to, with the processor, cause the electronic device to at least:

determine, automatically, if a desired playing position comprises a non-speech segment of at least a predetermined duration in response to a change in the playing location of an audio content to the desired playing position wherein if the desired playing position comprises a non-speech segment of at least a predetermined duration no adjustment to the playing position is performed;

wherein if the desired playing position does not comprise a non-speech segment of at least a predetermined duration, the method further comprises:

determine whether at least one non-speech period of at least the predetermined duration exists within a time interval in the vicinity of the desired playing position; and adjust, automatically, the desired playing position to fall within one non-speech period in response to determination of existence of at least one non-speech period of at least the predetermined duration within the time interval in the vicinity of the desired playing position, wherein, if more than one non-speech periods of at least the predetermined duration exist within the time interval in the vicinity of the desired playing position, the playing position is automatically adjusted to fall within the non-speech period that is closest in time to desired playing position.

15. The electronic device of claim 14, wherein the predetermined duration comprises a designated period of time before and after the desired playing position.

16. The electronic device of claim 14, wherein, if a non-speech period of at least the predetermined duration exists within the time interval in the vicinity of the desired playing position before the desired playing position, and if a non-speech period of at least the predetermined duration exists within the time interval in the vicinity of the desired playing position after the desired playing position, the playing position is automatically adjusted to fall within the non-speech period before the desired playing position.

17. The electronic device of claim 14, wherein if no non-speech period of at least the predetermined duration exists within the time interval in the vicinity of the desired playing position, the memory and computer program code are further configured to, with the processor, cause the electronic device to:

not adjust the playing position.

18. The electronic device of claim 14, wherein if no non-speech period of at least the predetermined duration exists within the time interval in the vicinity of the desired playing position, the memory and computer program code are further configured to, with the processor, cause the electronic device to:

lengthen the duration of the time interval in the vicinity of the desired playing position;

determine whether at least one non-speech period of at least a predetermined duration exists within the lengthened time interval in the vicinity of the desired playing position; and adjust, automatically, the desired playing position to fall within one non-speech period computer code for, if at least one non-speech period of at least the predetermined duration exists within the lengthened time interval in the vicinity of the desired playing position.

19. The electronic device of claim 14, wherein the at least one non-speech period comprises at least one silent period.

\* \* \* \* \*

UNITED STATES PATENT AND TRADEMARK OFFICE
CERTIFICATE OF CORRECTION

| | | |
|---|---|---|
| PATENT NO. | : 8,731,914 B2 | Page 1 of 1 |
| APPLICATION NO. | : 11/274612 | |
| DATED | : May 20, 2014 | |
| INVENTOR(S) | : Vainio et al. | |

It is certified that error appears in the above-identified patent and that said Letters Patent is hereby corrected as shown below:

In the Claims:

Column 6,
Line 51, "redetermined" should read --predetermined--.

Signed and Sealed this
Ninth Day of September, 2014

Michelle K. Lee
*Deputy Director of the United States Patent and Trademark Office*